United States Patent [19]

Crasset

[11] Patent Number: 5,624,014
[45] Date of Patent: Apr. 29, 1997

[54] DEVICE FOR ACTUATING A CLUTCH OR A GEAR BOX OR THE LIKE

[76] Inventor: Dominique Crasset, 4, Square Van Gogh, 95230 Soisy Sous Montmorency, France

[21] Appl. No.: 302,918
[22] PCT Filed: Mar. 18, 1993
[86] PCT No.: PCT/FR93/00272
  § 371 Date: Nov. 25, 1994
  § 102(e) Date: Nov. 25, 1994
[87] PCT Pub. No.: WO93/19411
  PCT Pub. Date: Sep. 30, 1993

[30] Foreign Application Priority Data

Mar. 20, 1992 [FR] France .................................. 92 03377

[51] Int. Cl.⁶ ............................................. F16D 13/04
[52] U.S. Cl. ......................... 192/33 R; 192/92; 192/93 A; 192/104 R
[58] Field of Search ............................. 192/33 R, 92, 192/93 A, 104 R

[56] References Cited

U.S. PATENT DOCUMENTS 1,735,201  11/1929  Janda ......................................... 192/92
3,071,021   1/1963  Miller et al. .

FOREIGN PATENT DOCUMENTS

| 599683 | 3/1922 | France . | |
|---|---|---|---|
| 877118 | 3/1942 | France . | |
| 1110019 | 11/1955 | France . | |
| 1006456 | 2/1957 | Germany . | |
| 1575414 | 12/1969 | Germany | 192/33 R |
| 2150255 | 4/1973 | Germany | 192/33 R |
| 570104 | 12/1957 | Italy | 192/92 |
| 60-34555 | 4/1983 | Japan . | |

*Primary Examiner*—Andrea L. Pitts
*Attorney, Agent, or Firm*—Graham & James LLP

[57] ABSTRACT

A device for actuating a system such as a clutch or a gearbox associated with an engine, particularly a motor vehicle engine, and comprising control element (26–31) and an actuation member (38). According to the invention, the device furthermore includes:

- a first shaft (4) rotationally driven by the engine;
- a second shaft (6) integral with the actuation member;
- coupling member (10, 13, 15, 16, 33) for coupling the second shaft to the first shaft under the action of the control element;
- a member (16, 32, 33; 48, 53) for uncoupling the second shaft from the first shaft after the second shaft has rotated through a predetermined angle; and
- a return spring (35) for returning the second shaft to its initial position after it has been uncoupled from the first shaft.

10 Claims, 5 Drawing Sheets

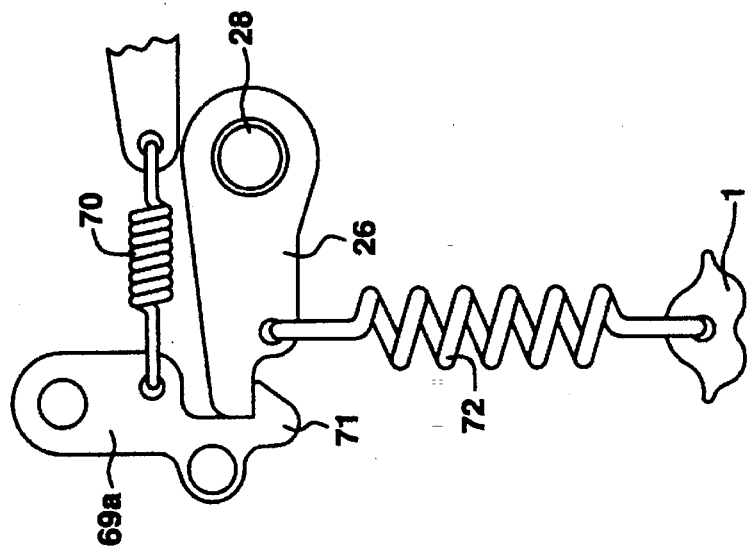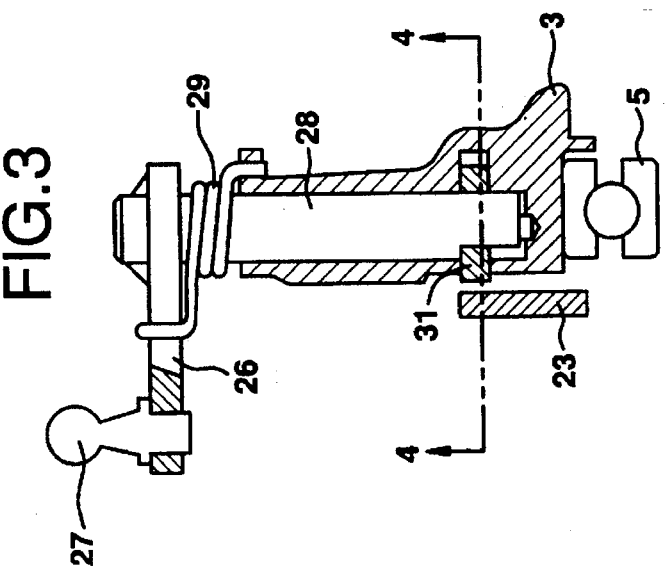

DEVICE FOR ACTUATING A CLUTCH OR A GEAR BOX OR THE LIKE

BACKGROUND OF THE INVENTION

The present invention relates to a device for actuating a system such as a clutch or a gearbox associated with an engine, particularly a motor vehicle engine, and of the type comprising control means and an actuation member.

There currently exist various types of mechanical gearbox with or without automatic clutch, and automatic gearboxes.

Mechanical gearboxes are also known in which both the gear change and the clutch are automatically controlled. Such automatic control involves complex and thus costly hydraulic or electrical systems which are difficult to maintain and consequently reserved in practice, until now, for competition vehicles.

The present invention aims particularly to provide a device making it possible to offer assistance to driving a motor vehicle which is simple and relatively inexpensive, and more particularly making it possible to assist the gear-change and clutch-engagement maneuvers.

Document FR-A-877,118 discloses a device for actuating a system such as a clutch or a gearbox associated with an engine, particularly a motor vehicle engine, and comprising control means and an actuation member, and furthermore including:

a first shaft rotationally driven by the engine, a second shaft integral with the actuation member, coupling means for coupling the second shaft to the first shaft under the action of the control means, means for uncoupling the second shaft from the first shaft after the second shaft has rotated through a predetermined angle, and return means for returning the second shaft to its initial position after it has been uncoupled from the first shaft.

More particularly, the coupling means are made up of a friction clutch including friction members, some of which are designed to be driven by the first shaft, and others of which are capable of driving the second shaft.

The friction members are coaxial with the first shaft, the first friction members being rotationally integral with the first shaft and the second friction members being rotationally integral with a support member itself rotationally integral with a gear wheel meshing with a toothed sector rotationally integral with the second shaft.

This is therefore a mechanical device whose energy source consists of the engine itself. The power takeoff may, of course, be located in the region of the output shaft of the engine or further downstream, for example on the output shaft of the gearbox. The control member in this case is produced in the form of a pedal.

This device consequently operates like a mechanical amplifier of the force exerted by the user.

It, however, exhibits the drawback that the user must make his action last until the end of the operating cycle. If the user fails to keep a continued force on the pedal to the end of the operating cycle, this cycle is interrupted and the operation of the device and of the members which it controls is disturbed.

SUMMARY OF THE INVENTION

The present invention aims to overcome this drawback. To this end, its subject is a device of the above-mentioned type, characterized in that it comprises means for keeping the coupling means coupled for as long as the second shaft has not made the said rotation through the predetermined angle.

Thus, the cycle finishes in all cases, even if the user interrupts his action.

More particularly, the holding means may comprise a cam and a cam follower, the rotation of the second shaft giving rise, by interaction of the cam and of the cam follower, firstly to the coupling of the second shaft to the first shaft and to their being held coupled, then, secondly, after the rotation through the predetermined angle, to their uncoupling.

In a particular embodiment, the uncoupling means comprise two uncoupling members, one of the uncoupling members including a cam such as a slot and the other uncoupling member bearing a cam follower such as a finger capable of moving in the slot, and one of the uncoupling members being integral with a casing of the device and the other uncoupling member being designed to be displaced in a first direction via a movement of the second shaft, displacement of this member in the first direction giving rise, through interaction of the cam follower and of the cam, to its displacement in a second direction which causes the second shaft to be uncoupled from the first shaft.

The rotation of the second shaft consequently positively causes the uncoupling of the first and second shafts by interaction of the above-mentioned finger and slot.

More particularly, the uncoupling member not integral with the casing may be integral with the support member in terms of axial translation.

In a particular embodiment, inhibition means are provided for inhibiting the return means for as long as the rotational speed of the first shaft is lower than a predetermined threshold.

In the case where the device is provided as assistance for clutching engagement, such an arrangement makes it possible to use the device not only during gear changes but also during starting.

The inhibition means may comprise pressing means for keeping the friction members pressed together, and at least one flyweight for pushing the pressing means back when the rotational speed of the first shaft exceeds the predetermined threshold.

More particularly, the holding means may comprise a cam designed to interact with a cam follower finger integral with one of the friction members, the cam being urged by elastic means in the direction of keeping the friction members in contact, and the flyweights acting on the cam against the action of the elastic means.

Advantageously, the control means comprise elastic means designed to control the device when they are freed by a user, and to be reset by the device during its operating cycle.

A control force is therefore available which is greater than that which the user is capable of providing.

BRIEF DESCRIPTION OF THE INVENTION

Particular embodiments of the invention will now be described by way of non-limiting example with reference to the appended drawings in which:

FIG. 1 is an axial section of a device according to the invention,

FIG. 2 is a view on a larger scale of the upper part of FIG. 1,

FIG. 3 is an axial section of the control member of the device of FIG. 1,

FIG. 4 is a section on IV—IV of FIG. 3.

FIG. 5 is a view on a larger scale still of a detail of FIG. 2.

FIG. 6 is a developed section on VI—VI of FIG. 5,

FIG. 7a is a section on VII—VII of FIG. 2,

FIG. 7b is a view similar to FIG. 7a in another position of the members represented, FIGS. 8a and 8b illustrate the actuation of a gearbox and of a clutch with the aid of a device according to the invention, and FIG. 9 represents another embodiment of the control members.

DETAILED DESCRIPTION OF THE PREFERRED EMBODIMENT

The device first of all includes a casing 1, closed by two end flanges 2 and 3.

A first shaft 4 is mounted in the casing 1 on rolling-contact bearings 5, and a second shaft 6 is also mounted in the casing on rolling-contact bearings 7.

BRIEF DESCRIPTION OF THE DRAWINGS

A pulley 8 is mounted on the outside of the casing on the first shaft 4, to which it is rotationally linked by a key 9.

The first shaft 4 also carries, inside the casing 1, a disk-carrying member 10, mounted to rotate on the shaft 4 by means of rolling-contact bearings 11.

Figure 1:
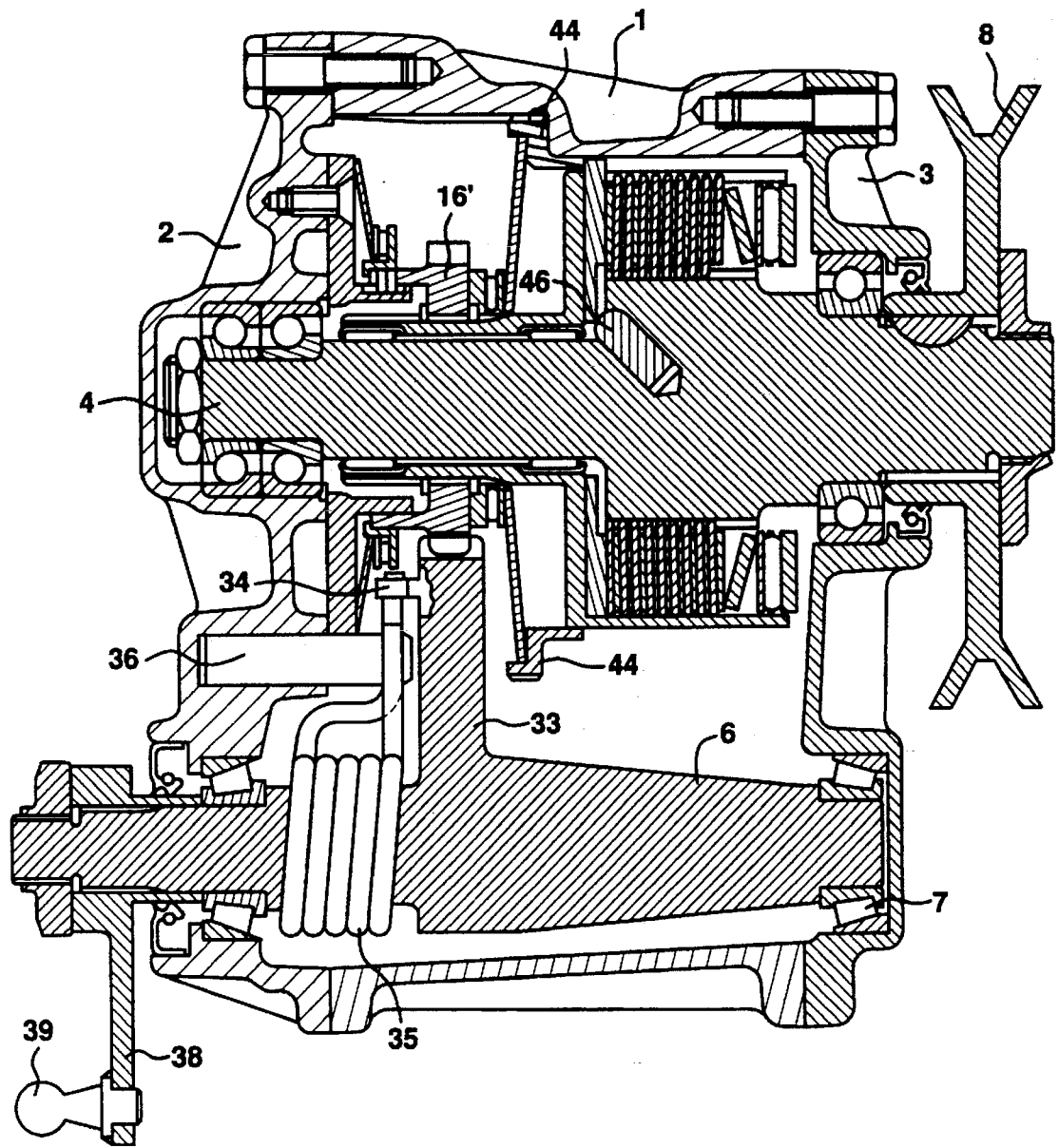
Figure 2:
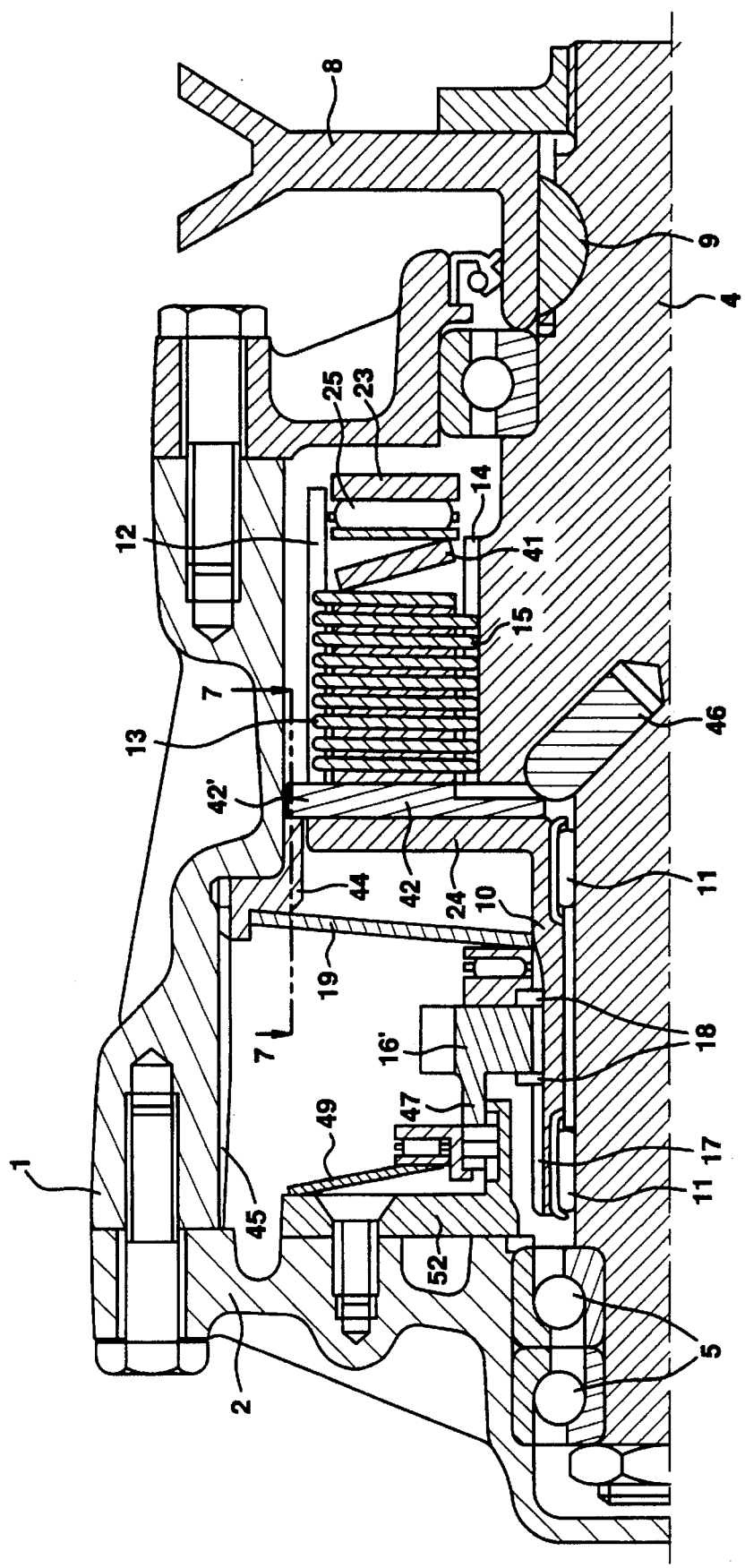
Figure 5:
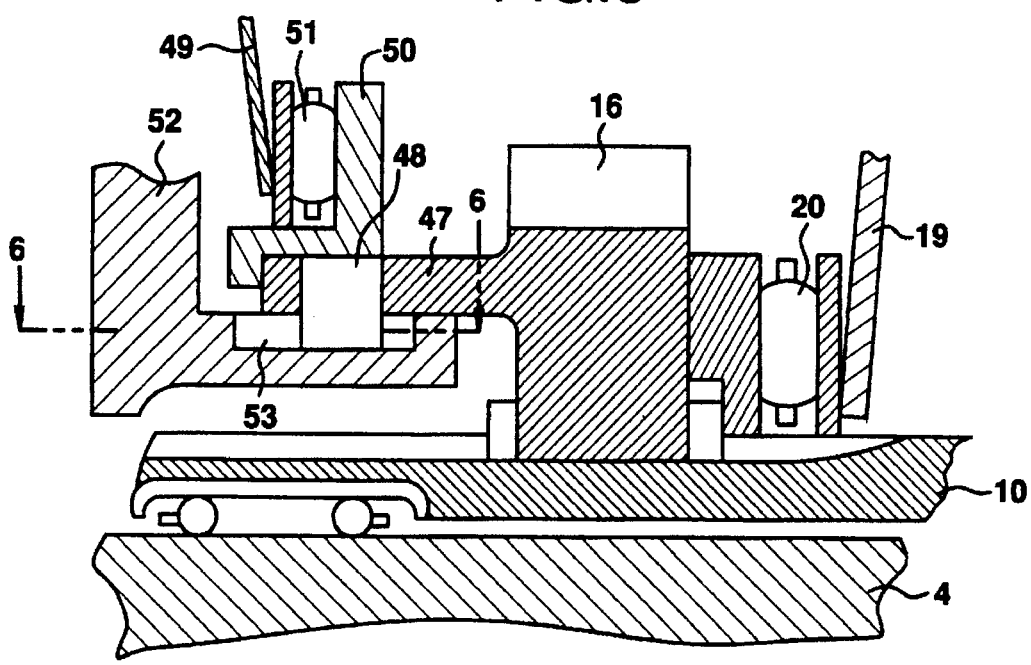

The disk-carrier 10 includes, in a known fashion, a cylindrical part including a slot 12 in which projections of friction disks 13 are engaged in order to make the disks 13 and the disk-carrier 10 rotationally integral.

Likewise, the shaft 4 includes a slot 14 in which projections of friction disks 15 which are interposed with the disks 13 are engaged, in order to make the disks 15 and the shaft 4 rotationally integral. The shaft 4, the disk-carrier 10 and the disks 13 and 15 are consequently coaxial.

A gear 16 with straight-cut teeth is mounted on the disk-carrier 10, rotationally integral with the latter by virtue of splines 17 and translationally integral by virtue of circlips 18.

An elastic washer 19 bearing, on the one hand, on the casing 1 and, on the other hand, on the gear 16 by means of a rolling-contact bearing 20, pushes the gear 16, and consequently the disk-carrier 10, back toward the left.

A pressure plate 23 makes it possible to clamp the friction disks, pressing them against a plate 24 forming the end of the cylindrical part of the disk-carrier 10, by means of a rolling-contact bearing 25.

If reference is now made to FIGS. 3 and 4, a control lever 26 can be seen connected to control means represented by a ball 27, and integral with a control pin 28 returned to the neutral position with respect to the flange 3 by a spring 29.

The part of the pin 28 opposite the lever 26 forms a flat 30 making it possible to make the shaft 28 rotationally integral with an eccentric 31 which, when the shaft 28 is rotationally driven, presses the pressure plate 23 so as to bring about a clamping of the disks 13 and 15.

Returning now to FIG. 1, it can be seen that the second shaft 6 is integral with a toothed sector 33 with straight-cut teeth interacting with the teeth of the gear 16.

The sector 33 forms a projection 34 on which one end of a hairpin spring 35 bears, the other end of which bears on a rod 36 mounted in the flange 2.

The end of the shaft 6 protruding from the flange 2 supports and is rotationally integral with an actuating lever 38 connected by means of a ball 39 to the member, not represented, which is to be actuated.

The pressure plate 23 ensures the clamping of the disks 13, 15 by means of an elastic washer 41. This clamping takes place against the plate 24 of the disk-carrier 10 by means of an intermediate plate 42 of which a finger 42', projecting at its outer periphery, passes through the slot 12 in order to interact with a slope 43 of a ring 44 sliding in the casing 1 by virtue of splines 45. The slopes 43 are designed such that a rotation of the disk-carrier 10 and of the intermediate plate 42 from their rest position gives rise, on the ring 44, to a force toward the left against the action of the elastic washer 19.

Flyweights 46 engaged in channels of the shaft 4 also tend to push the intermediate plate 42 back toward the left against the action of the elastic washer 19, when the shaft 4 is rotationally driven.

The gear 16 has a projection 47 supporting a cylindrical finger 48.

Another elastic washer 49 pushes the gear 16 back toward the right by means of a pressure ring 50 and of a rolling-contact bearing 51, against the action of the elastic washer 19.

A member 52 integral with the flange 2 includes a slot 53 forming a closed track in which the free end of the finger 48 moves.

Figure 6:
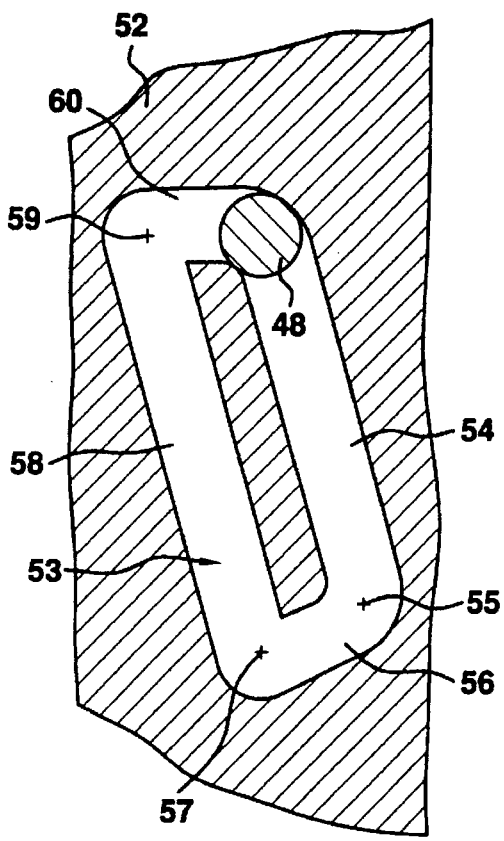
Figure 7A:
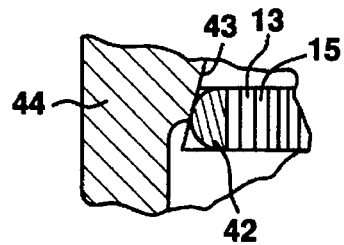
Figure 7B:
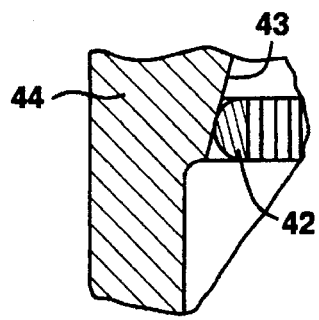

The finger 48 is represented in FIG. 6 in the rest position in which the gear 16 is in equilibrium between the actions of the elastic washers 19 and 49.

Starting from this position, the track 53 includes a first part 54 which slopes both with respect to the axial direction and with respect to the tangential direction as far as a position 55 of the finger 48, then a second part 56 which slopes in the same direction as the part 54 with respect to the tangential direction but in the opposite direction with respect to the axial direction as far as a position 57 situated axially at the same level as the starting position, then a third part 58 parallel to the part 54 and joining the position 57 to a position 59 located at the same level as the starting position in the tangential direction, and finally a fourth axial part 60 connecting the position 59 to the starting position. The track 53 therefore has substantially the shape of a right-angled trapezium with a right angle at position 55, and parts 54 and 56 extending with respect to the neutral positions axially 48 and 57 toward the right of the member 52 and parts 58 and 60 extending toward the left of these neutral positions axially.

The pulley 8 is rotationally driven, for example, by the engine with which is associated a gearbox which is to be controlled with the aid of the device. However, this pulley 8 may equally well be driven by the output shaft of this same gearbox, or by both these members simultaneously, by means of a differential gear train.

In operation, the first shaft 4 is consequently permanently rotationally driven. For as long as the control lever 26 is not actuated, the disks 15 are rotationally driven by the shaft 4 but the disks 13 remain stationary as, consequently, do the disk-carrier 10, the gear 16 and the shaft 6.

When the user acts on the control lever 26, he causes the pin 28 to pivot, the eccentric 31 then exerts an axial force on the pressure plate 23 which clamps up the disks 13, is consequently bringing about a rotation of the disk-carrier 10 and of the gear 16 which itself drives the shaft 6 by means of the toothed sector 33.

At the beginning of this rotation of the gear 16, the finger 48 moves in the part 54 of the track 53 from its starting position as far as the position 55, which gives rise to a displacement of the gear 16 and of the disk-carrier 10 toward the right, and consequently automatic engagement of the clutch made up of the disks 13 and 15. The clutch is thus clamped between the disk-carrier 10 and the eccentric 31 under the action of the elastic washer 41.

Then, still under the effect of the torque of the clutch, the finger 48 moves in the part 56 of the track 53 thus returning the disk-carrier toward the left and freeing the clutch of any pressure. The hairpin spring 35 then returns the shaft 6 to its starting position, this shaft in turn returning the gear 16 so that the finger 48 runs along the part 58 of the track 53 and arrives at position 59. The elastic washer 49 can then act and returns the finger 48 to its starting position.

Of course, the actuating lever 38 has effected the desired action during the travel of the finger through the parts 54 and 56 of the track 53 and is then returned to its starting position. The angle through which the shaft 6 has turned corresponds to the angular difference between the starting position and the position 57 of the finger 48, to within the demultiplication factor.

This device is automatically controlled by the rotational speed of the shaft 4.

Indeed, when the finger 48 moves in the part 56 of the track 53 and arrives in the vicinity of the position 57, the finger 42 of the intermediate plate 41 mounts the slope 43 of the ring 44 thus compressing the elastic washer 19 and producing, on the clutch, an axial force which holds the finger 48 in position 57, the compression force of the clutch due to the washer 19 giving rise to a torque in this clutch which is greater than that of the spring 35.

Under the effect of an increase in the rotational speed of the shaft 4, the flyweights 46 provide a force which is opposite to that of the elastic washer 19 which force is sufficient to relieve the clutch of the axial force due to this washer 19. Then the springs 35 and 49 return the finger to the position 59 and to the starting position as described previously.

Consequently, a simple action from the user is sufficient to trigger the desired actuation, owing to the automatic clamping of the clutch. The cycle then takes place automatically.

In addition, owing to the automatic speed control, this device is well suited to controlling a clutch.

Figure 8A:
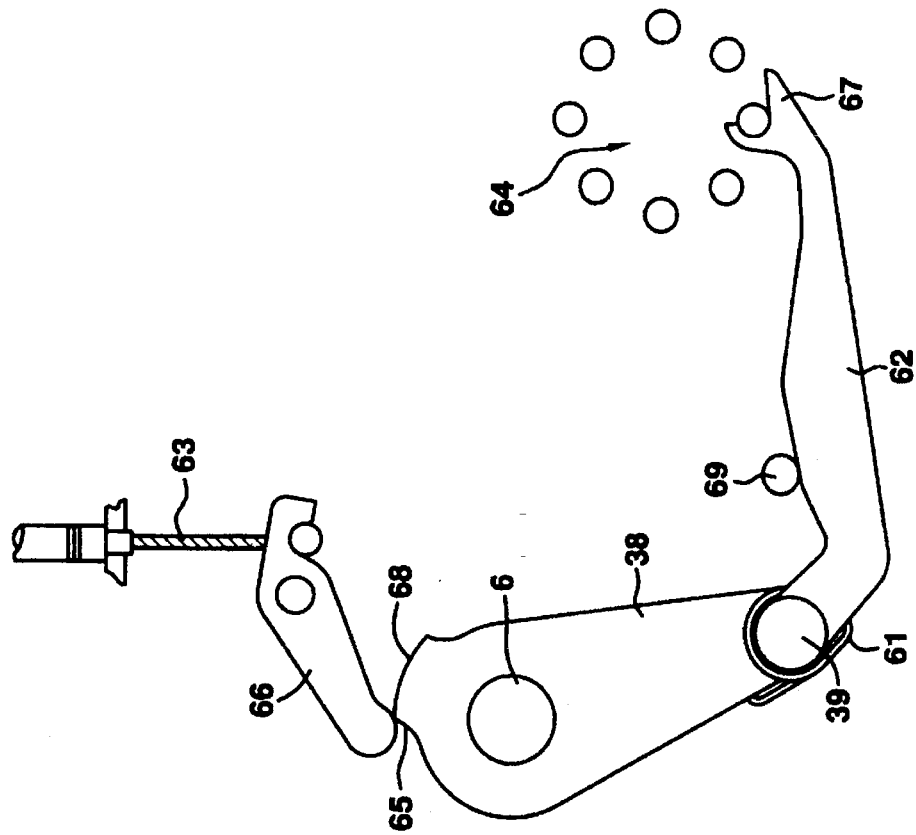
Figure 8B:
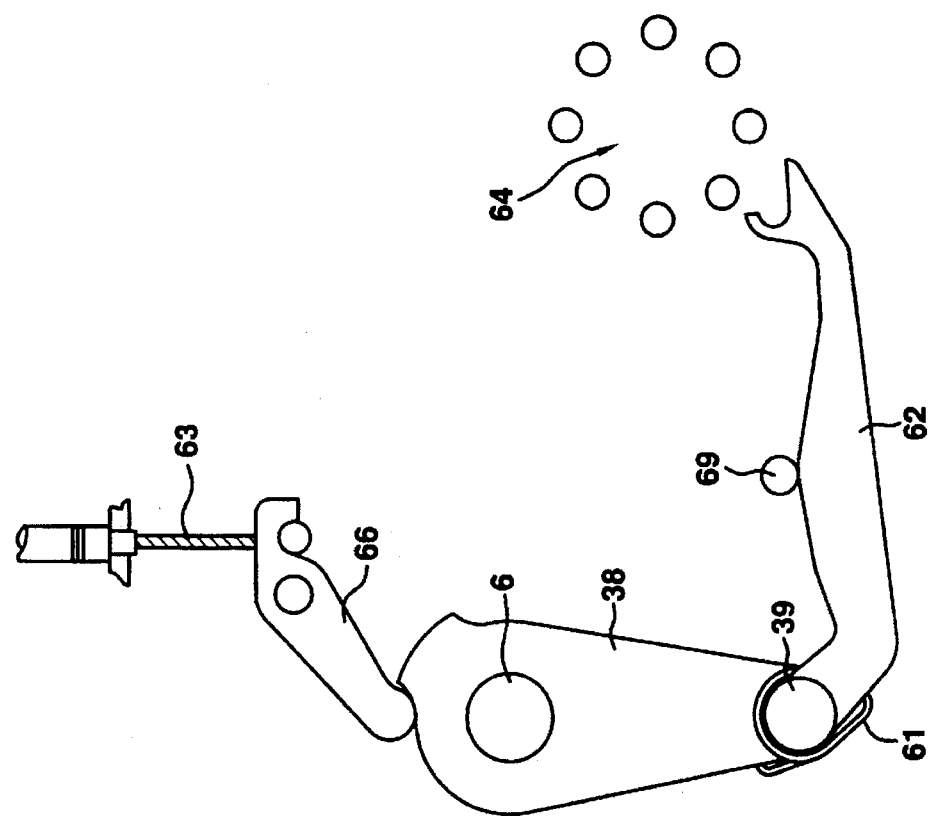

FIGS. 8 illustrate one use of the device for controlling a clutch and a gearbox.

The lever 38 here controls the clutch cable 63, and the ball 39 controls, by means of the forked lever 62, the selection barrel 64 of the gearbox in the same manner as in motorcycles. The lever 62 is pressed by a hairpin spring 61 against a stop 69.

The lever 38 forms a cam 65 interacting with a cam follower formed by another lever 66 to which the cable 63 for bringing about clutch release is connected.

During the clutch release travel of the lever 38, a clearance between the lever 62 and the selection barrel 64 allows clutch release, after which the barrel is driven by the fork 67 of the lever 62 while the cam-follower lever 66 progresses along a neutral part 68 of the lever 38.

When the shaft 6 returns to its starting position, the fork 67 is disengaged from the selection barrel 64 and the cam-follower lever 66 runs back down the cam surface 65, reengaging the engine.

FIG. 9 represents a variant of the control means in which the control acts on a lever 69a against the action of a spring 70. The lever 69 forms a hook 71 interacting with an edge of the control lever 26 which is here held bearing on the hook 71 via a spring 72, connected to the casing 1.

When the user makes the lever 69a pivot, the control lever 26 escapes from the tip of the hook 71 and the lever 26 is rotationally driven by the spring 72, in turn driving the control pin 28 and bringing about the desired action.

When the pressure plate 23 returns the eccentric 31 to its starting position, the lever 26 is itself returned against the action of the spring 72 and reengages in the hook 71 of the lever 69a by virtue of the spring 70.

The invention has been described with reference to the gearbox and clutch of a motor vehicle, but other applications, particularly stationary applications, may of course be envisaged.

Moreover, in the case where the forces to be exerted were very significant, it would be possible to place two devices according to the invention in series, the output shaft 6 of the first device constituting the control shaft 28 of the second.

Moreover, there has here been described a friction clutch consisting of a disk clutch, but a cone clutch or hydrodynamic clutch could just as well be used.

Finally, it will be noted that the control of the device according to the invention may easily be automated, with the vehicle then behaving like a vehicle with an automatic gearbox.

I claim:

1. Device for actuating a clutch or a gearbox associated with an engine, said device comprising control means (26–31) and an actuation member (38), and furthermore including:

a first shaft (4) adapted to be rotationally driven by the engine:

a second shaft (6) integral with the actuation member;

coupling means (10, 13, 15, 16, 33) for coupling the second shaft to the first shaft under the action of the control means;

means (48, 53) for uncoupling the second shaft from the first shaft after the second shaft has rotated through a predetermined angle; and return means (35) for returning the second shaft to its initial position, prior to the rotation thereof, after it has been uncoupled from the first shaft;

the improvement comprising automatic means (48, 53) for keeping the coupling means coupled for as long as the second shaft has not made a rotation through the predetermined angle.

2. Device according to claim 1, in which the means for keeping the coupling means coupled comprises a cam (53) and a cam follower (48), the rotation of the second shaft giving rise, by interaction of the cam and of the cam follower, firstly to the coupling of the second shaft to the first shaft and to their being held coupled, then secondly, after the rotation through a predetermined angle, to their uncoupling.

3. Device according to claim 1 in which the uncoupling means comprise two uncoupling members (47, 52), one of the uncoupling members (52) including a cam (53) and the other uncoupling member (47) bearing a cam follower (48) capable of moving around the cam, and one of the uncoupling members (52) being integral with a casing (1) of the device and the other uncoupling member (47) being designed to be displaced in a first direction via a rotational movement of the second shaft, displacement of this member in the first direction giving rise, through interaction of the cam follower and of the cam, to its displacement in a second direction which causes the second shaft to be uncoupled from the first shaft.

4. Device according to claim 2, in which the cam is a slot and the cam follower is a finger engaged in the slot.

5. Device according to claim 2, in which two friction members are coaxial with the first shaft, the first friction member being rotationally integral with the first shaft and the second friction member being rotationally integral with a support member (10) itself rotationally integral with a gear wheel (16) meshing with a toothed sector (33) rotationally integral with the second shaft, and in which the uncoupling member (47) not integral with the casing is integral with the support member (10) in terms of axial translation.

6. Device according to claim 5, comprising inhibition means (19, 42–46) for inhibiting the return means for as long as rotational speed of the first shaft is lower than a predetermined threshold.

7. Device according to claim 6, in which the coupling means comprise a friction clutch including at least two friction members (13, 15), one (15) of which is designed to be driven by the first shaft and the other (13) of which is capable of driving the second shaft, and in which the inhibition means comprise pressing means (19) for keeping the friction members pressed together, and at least one flyweight (46) for pushing the pressing means back when the rotational speed of the first shaft exceeds the predetermined threshold.

8. Device according to claim 7, in which the holding means comprise a cam (43) designed to interact with a cam follower finger (42) integral with one of the friction members, the device further comprising elastic means (19), with the cam being urged by the elastic means (19) towards the friction members, and wherein the flyweights supply a force on the cam in a direction opposite to the force supplied by the elastic means.

9. Device according to claim 8, wherein the control means comprise elastic means (72) adapted to automatically operate the device when the control means is freed by the user, and wherein the control means is reset by the device during the operating cycle thereof.

10. Device according to claim 1, wherein the engine is a motor vehicle engine.

* * * * *